United States Patent
Ran et al.

(10) Patent No.: US 6,209,026 B1
(45) Date of Patent: *Mar. 27, 2001

(54) CENTRAL PROCESSING AND COMBINED CENTRAL AND LOCAL PROCESSING OF PERSONALIZED REAL-TIME TRAVELER INFORMATION OVER INTERNET/INTRANET

(76) Inventors: Bin Ran; Jing Li, both of 5744 Wilshire Dr., Fitchburg, WI (US) 53711

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/813,903

(22) Filed: Mar. 7, 1997

(51) Int. Cl.[7] ................................................ G06F 19/00
(52) U.S. Cl. ................................................ 709/218; 702/3
(58) Field of Search .................... 364/423.098, 424.027, 364/424.028, 424.029, 443, 444.1, 420; 701/200, 201, 202, 208, 209, 210; 709/218, 217, 219; 395/200.31, 200.33; 702/3

(56) References Cited

U.S. PATENT DOCUMENTS

| | | |
|---|---|---|
| 5,523,950 | 6/1996 | Peterson . |
| 5,559,707 * | 9/1996 | DeLorme et al. ............. 364/433 |
| 5,654,886 * | 8/1997 | Zereski et al. ............. 709/218 |
| 5,835,755 * | 11/1998 | Stellwagen, Jr. ............. 395/600 |
| 5,848,378 * | 12/1998 | Shelton et al. ............. 702/3 |
| 5,940,776 * | 8/1999 | Baron et al. ............. 702/4 |
| 5,951,620 * | 9/1999 | Ahrens et al. ............. 701/200 |
| 5,999,882 * | 12/1999 | Simpson et al. ............. 702/3 |
| 6,076,111 * | 6/2000 | Chiu et al. ............. 709/232 |

OTHER PUBLICATIONS

"Travlink Project Concept Definition and Preliminary System Design"—Westinghouse Electric Corporation, Apr. 1994.

Department of Transportation's—"Intelligent Transportation Systems (ITS) Projects"—U.S. Department of Transportation.

* cited by examiner

Primary Examiner—Douglas Olms
Assistant Examiner—Ken Vanderpuye
(74) Attorney, Agent, or Firm—Lathrop & Clark LLP

(57) ABSTRACT

An Internet utility which receives information about a proposed trip, including trip origin, destination and time. The web based utility calculates at least one route and provides periodic automatic updates of information related to the route such as traffic and weather conditions. Other information which may be automatically periodically transmitted includes information about other transportation systems which may interface with a trip such as airline departure or arrival times. Specific information related to a trip or destination such as availability of parking at the destination also constitute the automatically transmitted information.

12 Claims, 3 Drawing Sheets

Fig.1  Interactively Transmitting Personalized Traveler Information

Top-Level Webpage

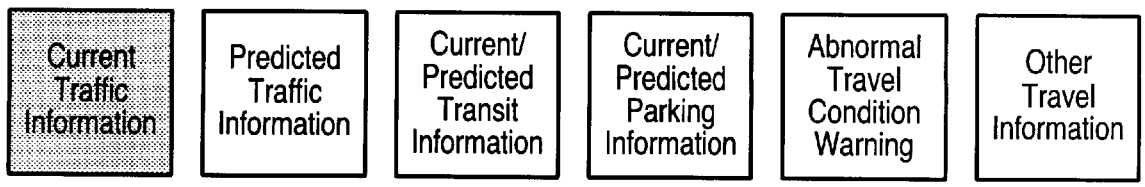

Second-Level Webpage
When 1) "Current Traffic Information" is selected;
2) "Freeway/City" is selected
3) "Incident" is selected.

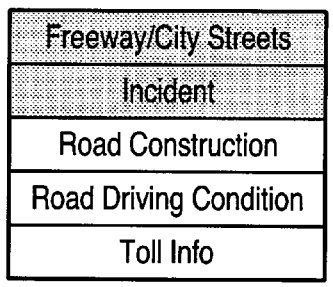

| Highway | Route | Selection | Incident | Speed (mph) | Travel Time (min) |
|---|---|---|---|---|---|
| Route #1: I-90 | From:1st St. | To: State St. | 1 | 25 | 28 |
| Route #2: I-41 | From:Lake St. | To: West St. | 0 | 38 | 35 |
| Route #3: | | | | | |
| Route #4: | | | | | |

| Info Updating Time:<br>7:00am<br>8:00am<br>4:40pm<br>5:05pm | Use this form as your default traveler info request form?<br><br>Y | Your Traveler Info Receiving Means:<br>webpage<br>email<br>pager |
|---|---|---|

*Fig.3*

CENTRAL PROCESSING AND COMBINED CENTRAL AND LOCAL PROCESSING OF PERSONALIZED REAL-TIME TRAVELER INFORMATION OVER INTERNET/INTRANET

BACKGROUND OF THE INVENTION

1. Field Of Invention

This invention relates generally to two processing methods and systems for providing personalized real-time traveler information over internet/intranet. More specifically, this invention relates to the system concepts and design methods of two personalized real-time traveler information systems over internet/intranet.

2. Description of the Related Art

Traveler information is provided to travelers via radio, TV, internet, and other means. However, such traveler information is not specifically designed and provided for the use of a particular user. A user has to receive all the content of traveler information provided, most of which is irrelevant to said user, and said user has to sort and process such information by themselves. Such an effort is inefficient and ineffective in most circumstances. Therefore, it is desirable to provide a means for individual users to receive personalized real-time traveler information via internet/intranet. Such information is exactly what said user needs and does not have irrelevant information for said user.

SUMMARY OF INVENTION

It is, therefore, an object of the present invention to provide a central processing system and a combined central and local processing system for providing personalized internet real-time traveler information via internet/intranet.

In accordance with one aspect of the present invention, said central processing system includes one or several host servers to collect and process individual requests for providing personalized real-time traveler information as well as to collect/process real-time traveler information from various sources, wherein such host servers include computer sever, web server, email server, gopher server, internet TV/cable TV/interactive TV server, internet kiosk or regular kiosk server, internet fax or regular fax server, internet phone or regular phone or cellular phone server, internet pager or hand-held device server, internet in-vehicle navigation server, and other internet servers.

In accordance with one aspect of the present invention, said combined central and local processing system includes one or several host servers and individual means to collect and process individual requests for providing personalized real-time traveler information as well as to collect/process real-time traveler information from various sources, wherein such host servers include computer sever, web server, internet in-vehicle navigation server, and other internet servers, and such individual means include internet software, web navigator and communicator, internet in-vehicle navigation system, and other internet tools.

In accordance with another aspect of the present invention, said central processing system uses a host server and its user interface (e.g., webpage, email, fax, etc.) to support various request forms for personalized traveler information and user specified update frequency over internet/intranet.

In accordance with another aspect of the present invention, said combined central and local processing system uses individual means and said host to support various combinations of the functional requests of personalized traveler information and user specified update frequency over internet/intranet.

In accordance with a further aspect of the present invention, said central processing system includes individual means for receiving and displaying/providing personalized real-time traveler information over internet/intranet, wherein said individual means comprise one or several of the following items: a personal computer having internet connection devices and internet connection programs (client software, internet software, telnet, ftp, email, gopher, navigator, communicator, etc.), web TV or cable TV or interactive TV, Kiosk or internet Kiosk, internet fax machine or regular fax machine, internet phone or cellular phone or regular phone, internet pager or handheld devices, internet in-vehicle navigation device, other internet information receiving devices.

In accordance with a further aspect of the present invention, said combined central and local processing system includes individual means for receiving, processing, and displaying/providing personalized real-time traveler information over internet/intranet, wherein said individual means include personal computer having internet connection devices and internet connection programs (client software, internet software, etc.), a personal computer having internet connection devices and web navigation programs (navigator, communicator, and plug-in software, etc.), an internet in-vehicle navigation device, and other internet information receiving devices.

In accordance with a still further aspect of the present invention, said central processing system assigns a universal user ID and password to a registered user and said user uses one or several of the following individual means and procedures to receive personalized real-time traveler information and warning: (1) filling or revising information/warning request forms and requesting a universal user ID and password for all individual means for receiving information and warning; (2) receiving personalized real-time traveler information; (3) receiving personalized abnormal real-time travel condition warning.

In accordance with a still further aspect of the present invention, said combined central and local processing system assigns a universal user ID and password to an individual user and said user uses one or several of the following individual means and procedures to receive/process personalized real-time traveler information and warning: (1) filling or revising information warning request forms and requesting a universal user ID and password for all individual means for receiving information and warning; (2) receiving and processing personalized real-time traveler information; (3) receiving and processing personalized abnormal real-time travel condition warning.

In accordance with yet another aspect of the present invention, a webpage-based central processing system for providing personalized real-time traveler information uses webpage site as an interactive graphical user interface for said user to access traveler information and input their personal preference and selections in terms of traveler information and receiving means, and said webpage server offers various procedures and hierarchical webpages for webpage users.

In accordance with yet another aspect of the present invention, a webpage-based combined central and local processing system for providing personalized real-time traveler information uses webpage site and said plug-in software as interactive graphical user interfaces for said user to access traveler information and input their personal preference and selections in terms of traveler information and receiving means, and said webpage server and said plug-in software offer various procedures and hierarchical webpages and external display windows for said webpage and said plug-in software users.

In accordance with still another aspect of the present invention, said webpage-based central processing system uses a host to receive various real-time traveler information from transportation agencies and other sources, to process real-time traveler information and warning into webpage format, and to place said processed information and warning in hierarchical and classified webpage structure in said web site.

In accordance with still another aspect of the present invention, said webpage-based combined central and local processing system uses said host to receive various real-time traveler information from transportation agencies and other sources, to process real-time traveler information and warning into webpage format, and to place the processed information and warning in hierarchical and classified webpage structure in said web site.

It is a further object of the present invention that in said webpage-based central processing system, said user uses an individual means such as a web navigator or communicator installed on a personal computer or internet computer or web TV to browse said webpage host, and to select and receive/display/announce said personalized real-time traveler information and warning via various information providing procedures.

It is a further object of the present invention that in said webpage-based combined central and local processing system, said user uses an individual means such as a web navigator or communicator and a plug-in software installed on a personal computer or internet computer or web TV to browse said webpage host, and select, receive, process, display and announce said personalized real-time traveler information and warning via various information providing procedures.

BRIEF DESCRIPTION OF THE DRAWINGS

The objects, features and functions of the present invention will become apparent from the detailed description of the preferred embodiments of the invention which follows, when considered in light of the accompanying drawings described in the following.

FIG. 3 shows an example design of webpages of said webpage-based central processing system or said webpage-based combined central and local processing system in accordance with an embodiment of the present invention.

DETAILED DESCRIPTION OF THE PREFERRED EMBODIMENTS OF THE INVENTION

The objective of this invention is to provide a central processing system and a combined central and local processing system for providing personalized real-time traveler information via internet/intranet. Said central processing system uses one or several host servers for receiving, storing, and processing real-time traveler information, receiving and processing all personal information requests, and transmitting real-time personalized traveler information data or graphics in real-time or periodically. It also uses one or several individual means for registering personal information requests, and receiving, displaying and announcing real-time or periodically updated personalized traveler information.

On the other hand, said combined central and local processing system uses one or several host servers for receiving, storing, and processing real-time traveler information, receiving and processing one part of personal information requests, and transmitting real-time traveler information database and one part of personalized traveler information data or graphics in real-time or periodically. Said system also uses one or several individual means for registering personal information requests, and receiving real-time or periodically updated traveler information database and one part of personalized traveler information data or graphics, processing one part of personal information requests displaying and announcing real-time or periodically updated personalized traveler information.

The major differences of said central processing system and said combined central and local processing system can be stated as follows. In a central processing system, all individual information requests are processed by said central server. Said individual means does not perform any processing task and only display or announce the personalized traveler information received from said host server. On the other hand, in a combined central and local processing system, said host server processes one part of personal information requests and transmits the processed traveler information to said individual means so that said individual means could process the remaining individual information requests and display or announce the personalized traveler information.

Figure 1:
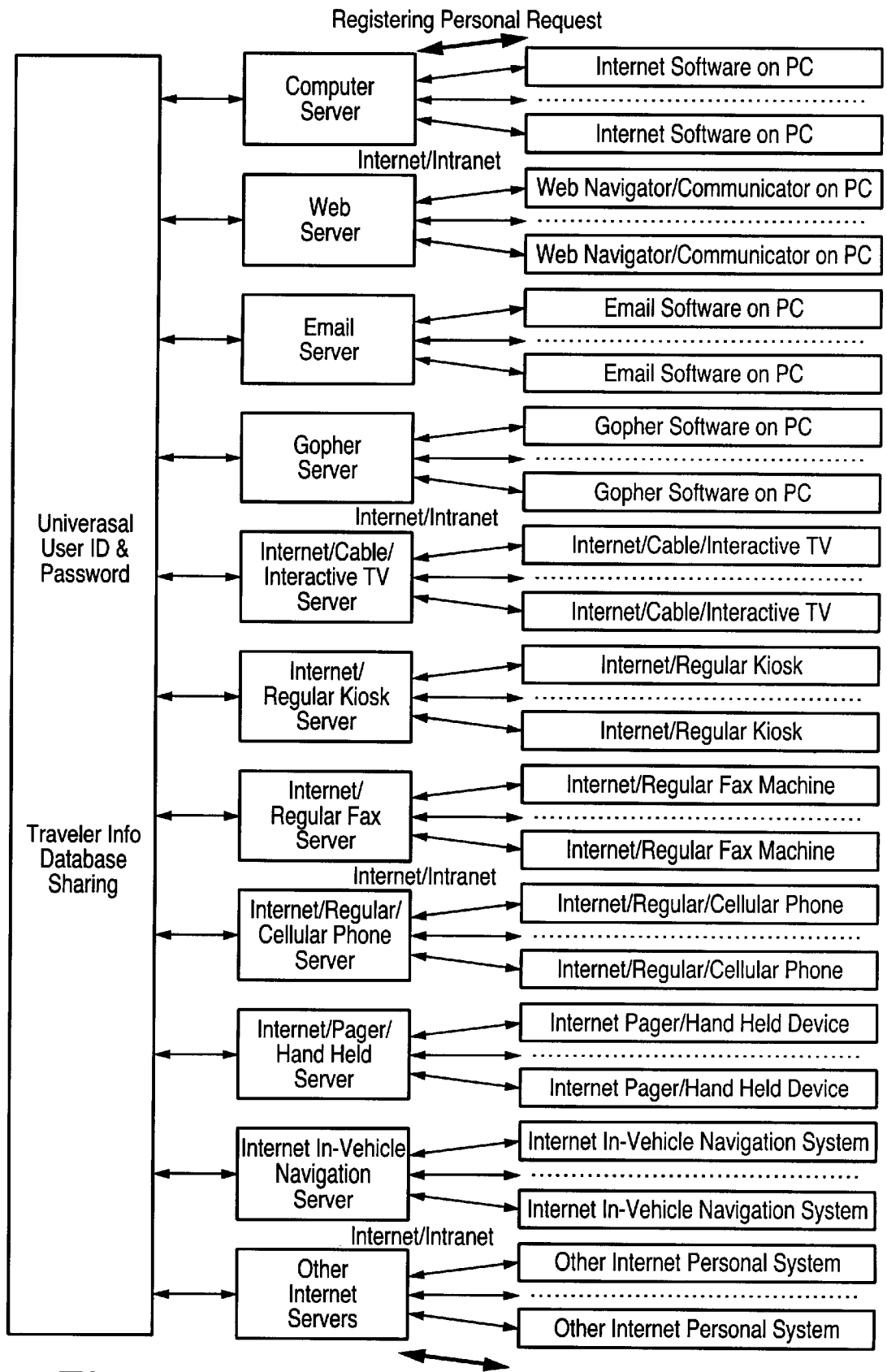
FIG. 1 shows the configuration structure and information flow of said central processing system for providing personalized real-time traveler information via internet/intranet.

FIG. 1 shows the configuration structure and information flow of said central processing system for providing personalized real-time traveler information via internet/intranet. In such a system, said host could be one or a combination of the following servers:

- a computer sever, such as a workstation server, mainframe server, or a personal computer server, which supports requests for personalized real-time traveler information via internet software,
- a web server, serving a webpage which supports request forms for personalized real-time traveler information via web navigator or communicator,
- an email server, serving email services which support email requests for personalized real-time traveler information via email,
- a gopher server, serving gopher services which support requests for personalized real-time traveler information via gopher,
- an internet TV/cable TV/interactive TV server, serving a webpage which supports request forms for personalized real-time traveler information via internet TV/cable TV/interactive TV,
- an internet kiosk or regular kiosk server, serving a kiosk which supports request forms for personalized real-time traveler information via internet kiosk or regular kiosk,
- an internet fax or regular fax server, serving fax service which supports request forms for personalized real-time traveler information via internet fax or regular fax, an internet phone or regular phone or cellular phone server, serving phone dial-in service which supports request forms for personalized real-time traveler information via internet phone or regular phone or cellular phone, an internet pager or hand-held device server, serving dial-in service which supports request forms for personalized real-time traveler information via internet pager or hand-held device, an internet in-vehicle navigation server, serving in-vehicle navigation service which supports request forms for personalized real-time traveler information via internet in-vehicle navigation devices, and other internet servers, serving internet information and/or service providing which support requests for personalized real-time traveler information.

The above host servers could share a common traveler information database. Moreover, these host servers are able to offer various traveler information and data processing functions in providing personalized real-time traveler information. For instance, one of said host servers could receive and store real-time traveler information from various sources, and process into a real-time traveler information database based on said internet software's format requirement, and said host could receive and process said user's request for real-time personalized traveler information and transmit completed real-time personalized traveler information to user's internet software based on user-defined frequency. Furthermore, one of said host servers could receive and store real-time traveler information from various sources, and process into a real-time traveler information database into html or other webpage format, and said host receives and process said user's request for real-time personalized traveler information and transmit completed real-time personalized traveler information to user's web navigator or communicator based on user-defined frequency.

Moreover, one of said host servers could receive and store real-time traveler information from various sources, and process into a real-time traveler information database in email format or user preferred format, and said host could receive and process said user's request for real-time personalized traveler information and transmit completed real-time personalized traveler information to user's email box based on user-defined frequency. One of said host servers could also receive and store real-time traveler information from various sources, and process into a real-time traveler information database in gopher format, and said host could receive and process said user's request for real-time personalized traveler information and transmit completed realtime personalized traveler information to said user's gopher software based on user-defined frequency.

Subsequently, one of said host servers could receive and store real-time traveler information from various sources, and process into a real-time traveler information database in interactive TV/web TV/cable TV format, and said host could receive and process said user's request for real-time personalized traveler information and transmit completed real-time personalized traveler information to user's interactive TV or web TV or cable TV based on user-defined frequency. One of said host servers could also receive and store real-time traveler information from various sources, and process into a real-time traveler information database in internet kiosk or regular kiosk inquiry format, and said host could receive and process said user's request for real-time personalized traveler information and transmit completed real-time personalized traveler information to user's internet kiosk or regular kiosk based on user-defined frequency.

In addition to the above functions, one of said host servers could receive and store real-time traveler information from various sources, and process into a real-time traveler information database in internet fax or regular fax inquiry format, and said host could receive and process said user's request for real-time personalized traveler information and transmit completed real-time personalized traveler information to user's internet fax machine or regular fax machine based on user-defined frequency. One of said host servers could also receive and store real-time traveler information from various sources, and process into a real-time traveler information database in internet phone or regular phone or cellular phone inquiry format, and said host could receive and process said user's request for real-time personalized traveler information and transmit completed real-time personalized traveler information to user's internet phone or regular phone or cellular phone based on user-defined frequency.

One of said host servers could also receive and store real-time traveler information from various sources, and process into a real-time traveler information database in internet pager or handheld device format, and said host could receive and process said user's real-time request for providing real-time personalized traveler information and transmit completed real-time personalized traveler information to user's internet pager or hand-held device based on user-defined frequency.

To serve in-vehicle information needs, one of said host servers could receive and store real-time traveler information from various sources, and process into a real-time traveler information database in internet in-vehicle navigation device format, and said host could receive and process said user's real-time request for providing real-time personalized traveler information and transmit completed real-time personalized traveler information to user's internet in-vehicle navigation device based on user-defined frequency. Of course, one of said host servers could receive and store real-time traveler information from various sources, and process into a real-time traveler information database in user preferred formats, and said host could receive and process said user's request for real-time personalized traveler information and transmit completed real-time personalized traveler information to said user's other internet tools.

Said host server of a central processing system uses the user interface (e.g., webpage, email, fax, etc.) to support various request forms for personalized traveler information and user specified update frequency. These information request forms are summarized as follows:

a) current traffic information form with information request on current information on freeways, arterials, and main city streets, including point-to-point and route-specific speed, travel time, incident (location, expected duration of clearance time, delay, lane closures, and impact on traffic), volume, road construction (location, planned duration and time for road and lane closure, delay, detours, and impact on traffic), road and driving condition (icy, wet, raining, snow, fogy, rough pavement, and pat holes), weather, toll (price, toll plaza congestion), route maps, traffic congestion map, special events, bicycle, and public information, b) predicted traffic information form with information request on items in a) based on prediction and predicted point-to-point and route-specific traffic congestion on weekdays, weekends, holidays, and special events, traffic congestion forecast map, c) current/predicted transit information form with information request on current/predicted bus/subway/train/ferry information, including point-to-point and route-specific route suggestion, schedule, stops, fares, delays, arrival times, route maps, real-time status, special messages, elderly and disabled, park-and-ride (location, availability, parking), carpool and van-pool information, and other ridesharing matching information, transit information map, d) current/predicted parking information form with information request on route-specific and destination-specific location, direction, availability, price, and parking information map, etc., e) travel choice advisory form with information request on highway travel advisory, including point-to-point and route-specific trip planning, alternative routes, current shortest routes, anticipated shortest routes, least cost routes, suggested departure time change, suggested destination (ramp or parking lot) change, alternative parking, transit travel advisory, including point-to-point and route-specific transit trip planning, alternative routes, multi-modal travel advisory, including point-to-point and route-specific trip planning, alternative routes, current/anticipated shortest routes, least cost route, best travel modes or combinations of modes, suggested departure time change, suggested destination (ramp or parking lot) change, alternative parking, etc., point-to-point and route-specific travel advisory information map, f) abnormal travel condition warning function with warning means of display, voice, or email and warning on route-specific and point-to-point travel time, speed, incident, construction activities, driving condition, parking, weather, transit, special events, toll, bicycle, and public information, g) other travel information functions with route-specific and point-to-point information on special events and their impact on traffic, airport (flight departure/arrival times, airport parking conditions), rent-a-car information (availability, price, location, reservation), taxi information (reservation and fare), tourist (traffic prediction and estimation of recreational activities), bicycle commuting (route suggestion), public information, enforcement and program information supporting HOV use, h) travel information map display function with route-specific and point-to-point display of traffic congestion map, traffic congestion forecast map, transit information map, parking information map, travel advisory information map, other travel information map.

As shown in FIG. 1, individual means of a central processing system comprise one or several of the following items:

a personal computer having internet connection devices, internet connection programs (client software, internet software, telnet, ftp, email, gopher, navigator, communicator, etc.) and monitor, wherein said internet connection devices and programs are used to connect said personal computer to host server over the internet/intranet, and said monitor will display or broadcast or print the retrieved interactive personalized real-time traveler information, an web TV or cable TV or interactive TV or Kiosk or internet Kiosk having internet connection means, wherein said internet connection means are used to connect said web TV or cable TV or interactive TV or Kiosk or internet Kiosk to host server over the internet/intranet and will display and/or broadcast the retrieved interactive personalized real-time traveler information, an internet fax machine or regular fax machine or internet phone or cellular phone or regular phone, having internet connection means, wherein said internet connection means (or regular phone line or cellular phone connection) are used to connect said internet fax machine or regular fax machine or internet phone or cellular phone or regular phone to host server (with internet fax and phone capability) over the internet/intranet, and said internet fax machine or regular fax machine or internet phone or cellular phone or regular phone will print or broadcast/read the retrieved interactive personalized real-time traveler information, an internet pager or hand-held devices, having internet connection means, wherein said internet connection means are used to connect said internet pager or hand-held devices to host server over the internet/intranet, and said internet pager or hand-held devices will display or print or read the retrieved interactive personalized real-time traveler information, an internet in-vehicle navigation device, having wireless internet connection means, wherein said wireless internet connection means are used to connect said internet in-vehicle navigation device to host server over the internet/intranet, and will display or broadcast the retrieved interactive personalized traveler information, and other internet information receiving devices, having internet connection means, wherein said internet connection means are used to connect said internet information receiving devices to host server over the internet/intranet, and will display or broadcast or print the retrieved interactive personalized real-time traveler information.

Also as shown in FIG. 1, an individual user of a central processing system could register at said host servers and obtain a universal user ID and password for all individual means for receiving information. Then, said user could use one or several of the following individual means and procedures to receive personalized real-time traveler information and warning.

(1) Fill or revise information/warning request forms and request a universal user ID and password for all individual means for receiving information and warning via the following procedures (skip this step if said user has completed the forms and does not need to revise):

1a) the personalized information providing procedure of a personal computer by using an internet software server as follows: starting an internet software or a client software, going to said software's various request forms for personalized real-time traveler information, selecting a request form on said software, inputting the desired functional items/requests and information update frequency in the request form as default, sending completed forms, completing registration forms if being a first-time user, 1b) the personalized information providing procedure of a personal computer or a web TV/cable TV/Kiosks by using a webpage server as follows: starting a web navigator or communicator, going to said host webpage with various request forms for personalized real-time traveler information and/or warning, selecting a request form on said host webpage, inputting the desired functional items/requests and information update frequency in the request form as default, completing registration forms if being a first-time user, 1c) the personalized information providing procedure of a personal computer or a web TV/cable TV/Kiosks by using an email server as follows: starting an email software, sending a request email to said email host with various request forms for personalized real-time traveler information, receiving a request form from said email host, inputting the desired functional items/requests and information update frequency in the request form as default, sending completed request form to said email host, completing registration forms if being a first-time user, 1d) the personalized information providing procedure of a personal computer or an web TV/cable TV/Kiosks by using a gopher server as follows: starting a gopher software, going to said gopher host with various request forms for personalized real-time traveler information, selecting a request form on said gopher host, inputting the desired functional items/requests and information update frequency in the request form as default, completing registration forms if being a first-time user, 1e) the personalized information providing procedure of an internet fax machine (or regular fax machine) by using a centralizedfax server as follows: starting said internet fax machine (or regular fax machine) by dialing said fax server number or internet address, selecting and receiving an empty request form for personalized real-time traveler information from said host, inputting the desired functional items/requests in the request form as default, completing registration forms if being a first-time user, and sending out completed request forms to said fax server, 1f) the personalized information providing procedure of an internet phone or regular phone or cellular phone by using a centralized phone server as follows: starting said internet phone (or regular phone or cellular phone) by dialing said phone server number or internet address, selecting an empty request form for personalized real-time traveler information from said phone host via digital choices, inputting the desired functional items/requests in the request form via digital choices as default, completing registration forms if being a first-time user, 1g) the personalized information providing procedure of an internet pager or hand-held devices by using a centralized server as follows: using any of the procedures as stated in procedures 1a)–1f); or filling request forms for pager company or host server by regular mail or at host specified sites, and 1h) the personalized information providing procedure of an internet in-vehicle navigation device by using a centralized server as follows: using any of the procedures as stated in procedures 1a)–1f); or filling request forms for information service providing company or host server by regular mail or at host specified sites; or starting internet in-vehicle navigation device, finding request forms for personalized real-time traveler information, selecting a request form, inputting the desired functional items/requests in the request form as default, completing registration forms if being a first-time user, wherein a universal user ID and password for all individual means for receiving information will be sent to said user via user-specified means after the initial registration.

(2) Receive personalized real-time traveler information via the following procedures (if said user expects to receive abnormal travel condition warning only, skip this step and going to Step (3) directly):

2a) the personalized information providing procedure of a personal computer by using an internet software server as follows:

starting an internet software or client software, going to default forms showing personalized real-time traveler information on said internet software or client software, requesting host processing, receiving and displaying/announcing said desired personalized real-time traveler information on said internet software or client software, wherein, if internet software server is very efficient and powerful (high-end workstation, mainframe, or supercomputer), said host identifies user's ID number and password (IP address or other number), finds user-defined default functional items/requests, processes said requested real-time traveler information, and sends back the processed personalized real-time traveler information to said user's internet software or client software based on user-specified or host default update frequency, or if internet software server is a conventional server, said host identifies user's default functional items/requests based on newly received messages (no user ID number and no request forms stored at host server), processes said requested real-time traveler information, and sends back the processed personalized real-time traveler information to said user's internet software or client software based on user-specified or host default update frequency, 2b) the personalized information providing procedure of a personal computer or a web TV/cable TV/Kiosks by using a webpage server as follows:

starting a web navigator or communicator, going to said host webpage, using bookmark or other means to start the default functional items/requests, requesting webpage host processing, displaying/announcing said desired personalized real-time traveler information on the web navigator or communicator, wherein, if webpage host is very efficient and powerful (high-end workstation, mainframe, or supercomputer), said host identifies user's ID number and password (IP address or other number), finds user-defined default functional items/requests, processes said requested real-time traveler information, and sends back the processed personalized real-time traveler information to said user's web navigator or communicator based on user-specified or host default update frequency, or if webpage host is a conventional server, said host identifies user's default functional items/requests based on newly received bookmark or other messages (no user ID number and no request forms stored at host server), processes said requested real-time traveler information, and sends back the processed personalized real-time traveler information to said user's web navigator or communicator based on user-specified or host default update frequency, 2c) the personalized information providing procedure of a personal computer or a web TV/cable TV/Kiosks by using an email server as follows:

starting an email software, receiving and displaying said desired personalized real-time traveler information in email box based on default functional items/requests and email update frequency, 2d) the personalized information providing procedure of a personal computer or a web TV/cable TV/Kiosks by using a gopher server as follows:

starting a gopher software, using bookmark or other means to go to user-specific gopher page, starting the default functional items/requests, requesting gopher host processing, displaying said desired personalized real-time traveler information on the gopher software, wherein, if gopher host is very efficient and powerful (high-end workstation, mainframe, or supercomputer), said host identifies user's ID number and password (IP address or other number), finds user-defined default functional items/requests, processes said requested real-time traveler information, and sends back the processed personalized real-time traveler information to said user's gopher software based on user-specified or host default update frequency, or if gopher host is a conventional server, said host identifies user's default functional items/requests based on newly received bookmark or other messages (no user ID number and no request forms stored at host server), processes said requested real-time traveler information, and sends back the processed personalized real-time traveler information to said user's gopher software based on user-specified or host default update frequency, 2e) the personalized information providing procedure of an internet fax machine or regular fax machine) by using a centralized fax server as follows:

starting said internet fax machine (or regular fax machine) by dialing said fax server number or internet address, requesting host server processing, while the fax host server will identify said user's ID number and password, find said user's information request form and items, process the requested real-time traveler information and sent back the processed personalized real-time traveler information as user-defined default functional items/requests to said user's fax machine over internet (or regular phone line or cellular phone connection), 2f) the personalized information providing procedure of an internet phone or regular phone or cellular phone by using a centralized phone server as follows:

starting said internet phone (or regular phone or cellular phone) by dialing said phone server number or internet address, requesting host server processing, while the phone host server will identify said user's ID number and password, find said user's information request form and items, process the requested real-time traveler information and read the processed personalized real-time traveler information as user-defined default functional items/requests to said user's internet phone or regular phone or cellular phone, 2g) the personalized information providing procedure of an internet pager or hand-held devices by using a centralized pager server or hand-held device server as follows:

starting said pager or hand-held device by dialing said server number or internet address, requesting host server processing, while the pager or hand-held device host server will identify said user's ID number and password, find said user's information request form and items, process the requested real-time traveler information and send back the processed personalized real-time traveler information as user-defined default functional items/requests to said user's internet pager or hand-held devices, showing/reading/printing the desired personalized real-time traveler information on the internet pager or hand-held devices, 2h) the personalized information providing procedure of an internet in-vehicle navigation device by using a centralized vehicle navigation server as follows:

starting an internet-based in-vehicle navigation device, requesting internet in-vehicle navigation host processing, while the internet in-vehicle navigation host server will identify said user's ID number and password, find said user's information request form and items, will process the requested real-time traveler information and sent back the processed personalized real-time traveler information to said user's internet in-vehicle navigation device, showing/announcing the desired personalized real-time traveler information on the internet in-vehicle navigation device.

(3) Receive personalized abnormal real-time travel condition warning via the following procedures:

3a) the personalized abnormal real-time travel condition warning providing procedure of a personal computer by using an internet software server as follows:

starting an internet software or client software, going to default forms showing personalized real-time traveler information on said internet software or client software, requesting host processing, receiving and displaying said desired personalized abnormal real-time travel condition warning on said internet software or client software, wherein, if internet software server is very efficient and powerful (high-end workstation, mainframe, or supercomputer), said host identifies user's ID number and password (IP address or other number), finds user-defined default functional items/requests, processes said requested real-time traveler information, and sends back the processed personalized abnormal real-time travel condition warning to said user's internet software or client software based on userB. specified or host default update frequency, no warning message being received if no abnormal warning being detected by said server, or if internet software server is a conventional server, said host identifies user's default functional items/requests based on newly received messages (no user ID number and no request forms stored at host server), processes said requested real-time traveler information, and sends back the processed personalized abnormal real-time travel condition warning to said user's internet software or client software based on user-specified or host default update frequency, no warning message being received if no abnormal warning being detected by said server, 3b) the personalized abnormal real-time travel condition warning providing procedure of a personal computer or an internet TV/cable TV/Kiosks by using a webpage server as follows:

starting a web navigator or communicator, going to said host webpage, using bookmark or other means to start the default functional items/requests, requesting webpage host processing, displaying said desired personalized abnormal real-time travel condition warning on the web navigator or communicator, wherein, if webpage host is very efficient and powerful (high-end workstation, mainframe, or supercomputer), said host identifies user's ID number and password (IP address or other number), finds user-defined default functional items/requests, processes said requested real-time traveler information, and sends back the processed personalized abnormal real-time travel condition warning to said user's web navigator or communicator based on user-specified or host default update frequency, no warning message being received if no abnormal warning being detected by said server, or if webpage host is a conventional server, said host identifies user's default functional items/requests based on newly received bookmark or other messages (no user ID number and no request forms stored at host server), processes said requested real-time traveler information, and sends back the processed personalized abnormal real-time travel condition warning to said user's web navigator or communicator based on user-specified or host default update frequency, no warning message being received if no abnormal warning being detected by said server, 3c) the personalized abnormal real-time travel condition warning providing procedure of a personal computer or an internet TV/cable TV/Kiosks by using an email server as follows:

starting an email software, receiving and displaying said desired personalized abnormal real-time travel condition warning in email based on default functional items/requests and email update frequency, no warning email being received if no abnormal warning being detected by said server, 3d) the personalized information providing procedure of a personal computer or an internet TV/cable TV/Kiosks by using a gopher server as follows:

starting a gopher software, using bookmark or other means to go to user-specific gopher page, starting the default functional items/requests, requesting gopher host processing, displaying said desired personalized abnormal real-time travel condition warning on the gopher software, wherein, if gopher host is very efficient and powerful (high-end workstation, mainframe, or supercomputer), said host identifies user's ID number and password (IP address or other number), finds user-defined default functional items/requests, processes said requested real-time traveler information, and sends back the processed personalized abnormal real-time travel condition warning to said user's gopher software based on user-specified or host default update frequency, no gopher content being sent to said user's gopher software if no abnormal warning being detected by said server, or if gopher host is a conventional server, said host identifies user's default functional items/requests based on newly received bookmark or other messages (no user ID number and no request forms stored at host server), processes said requested real-time traveler information, and sends back the processed personalized abnormal real-time travel condition warning to said user's gopher software based on user-specified or host default update frequency, no warning gopher content being sent to said user's gopher software if no abnormal warning being detected by said server, 3e) the personalized abnormal real-time travel condition warning providing procedure of an internet fax machine (or regular fax machine) by using a centralizedfax server as follows: starting said internet fax machine (or regular fax machine) by dialing said fax server number or internet address, requesting host server processing, while the fax host server will identify said user's ID number and password, find said user's information request form and items, process the requested real-time traveler information and sent back the processed personalized abnormal real-time travel condition warning as user-defined default functional items/requests to said user's fax machine over internet (or regular phone line or cellular phone connection), no warning fax being sent to said user if no abnormal warning being detected by said server, 3f) the personalized abnormal real-time travel condition warning providing procedure of an internet phone or regular phone or cellular phone by using a centralized phone server as follows:

starting said internet phone (or regular phone or cellular phone) by dialing said phone server number or internet address, requesting host server processing, while the phone host server will identify said user's ID number and password, find said user's information request form and items, process the requested real-time traveler information and read the processed personalized abnormal real-time travel condition warning as user-defined default functional items/requests to said user's internet phone or regular phone or cellular phone, no warning phone message being received or heard by said user if no abnormal warning being detected by said server, 3g) the personalized abnormal real-time travel condition warning providing procedure of an internet pager or hand-held devices by using a centralized pager server or hand-held device server as follows:

starting said pager or hand-held devices by dialing said server number or internet address, requesting host server processing, while the pager or hand-held device host server will identify said user's ID number and password, find said user's information request form and items, process the requested real-time traveler information and send back the processed personalized abnormal real-time travel condition warning as user-defined default functional items/requests to said user's internet pager or hand-held devices, showing/reading/printing the desired personalized abnormal real-time travel condition warning on the internet pager or hand-held devices, no warning message being sent to said user's internet pager or hand-held devices if no abnormal warning being detected by said server, 3h) the personalized abnormal real-time travel condition warning providing procedure of an internet in-vehicle navigation device by using a centralized vehicle navigation server as follows:

starting an internet-based in-vehicle navigation device, requesting internet in-vehicle navigation host processing, while the internet in-vehicle navigation host server will identify said user's ID number and password, find said user's information request form and items, will process the requested abnormal real-time travel condition warning and sent back the processed personalized abnormal real-time travel condition warning as user-defined default functional items/requests to said user's internet invehicle navigation device, showing/announcing the desired personalized abnormal real-time travel condition warning on the internet in-vehicle navigation device, no warning message being sent to said user's internet in-vehicle navigation device if no abnormal warning being detected by said server.

As the second major system disclosed in this invention, a combined central and local processing system uses individual means and host to support various combinations of the following functions and user specified update frequency:

a) current traffic information form with information request on
   current information on freeways, arterials, and main city streets, including point-to-point and route-specific speed, travel time, incident (location, expected duration of clearance time, delay, lane closures, and impact on traffic), volume, road construction (location, planned duration and time for road and lane closure, delay, detours, and impact on traffic), road and driving condition (icy, wet, raining, snow, fogy, rough pavement, and pat holes), weather, toll (price, toll plaza congestion), route maps, traffic congestion map, special events, bicycle, and public information,
b) predicted traffic information form with information request on
   items in a) based on prediction and predicted point-to-point and route-specific traffic congestion on weekdays, weekends, holidays, and special events, traffic congestion forecast map,
c) current/predicted transit information form with information request on
   current/predicted bus/subway/train/ferry information, including point-to-point and route-specific route suggestion, schedule, stops, fares, delays, arrival times, route maps, real-time status, special messages, elderly and disabled, park-and-ride (location, availability, parking), carpool and van-pool information, and other ridesharing matching information, transit information map,
d) current/predicted parking information form with information request on route-specific and destination-specific location, direction, availability, price, and parking information map, etc.,
e) travel choice advisory form with information request on
   highway travel advisory, including point-to-point and route-specific trip planning, alternative routes, current shortest routes, anticipated shortest routes, least cost routes, suggested departure time change, suggested destination (ramp or parking lot) change, alternative parking,
   transit travel advisory, including point-to-point and route-specific transit trip planning, alternative routes,
   multi-modal travel advisory, including point-to-point and route-specific trip planning, alternative routes, current/anticipated shortest routes, least cost routes, best travel modes or combinations of modes, suggested departure time change, suggested destination (ramp or parking lot) change, alternative parking, etc.,
   point-to-point and route-specific travel advisory information map,
f) abnormal travel condition warning function with warning means of display, voice, or email and warning on route-specific and point-to-point travel time, speed, incident, construction activities, driving condition, parking, weather, transit, special events, toll, bicycle, and public information,
g) other travel information functions with route-specific and point-to-point information on
   special events and their impact on traffic, airport (flight departure/arrival times, airport parking conditions), rent-a-car information (availability, price, location, reservation), taxi information (reservation and fare), tourist (traffic prediction and estimation of recreational activities), bicycle commuting (route suggestion), public information, enforcement and program information supporting HOV use,
h) travel information map display function with route-specific and point-to-point display of
   traffic congestion map,
   traffic congestion forecast map,
   transit information map,
   parking information map,
   travel advisory information map,
   other travel information map.

Depending on the allocation of the above functions between the individual means and the host, the degrees of central processing and local processing will be different. As one extreme, if all the above functions are supported by said host, said combined central and local processing system will become a central processing system. On the other hand, if all the above functions are supported by said individual means, and said host only provides a standard traveler information database and does not support any personalized traveler information function, said combined central and local processing system will become a pure local processing system.

Figure 2:
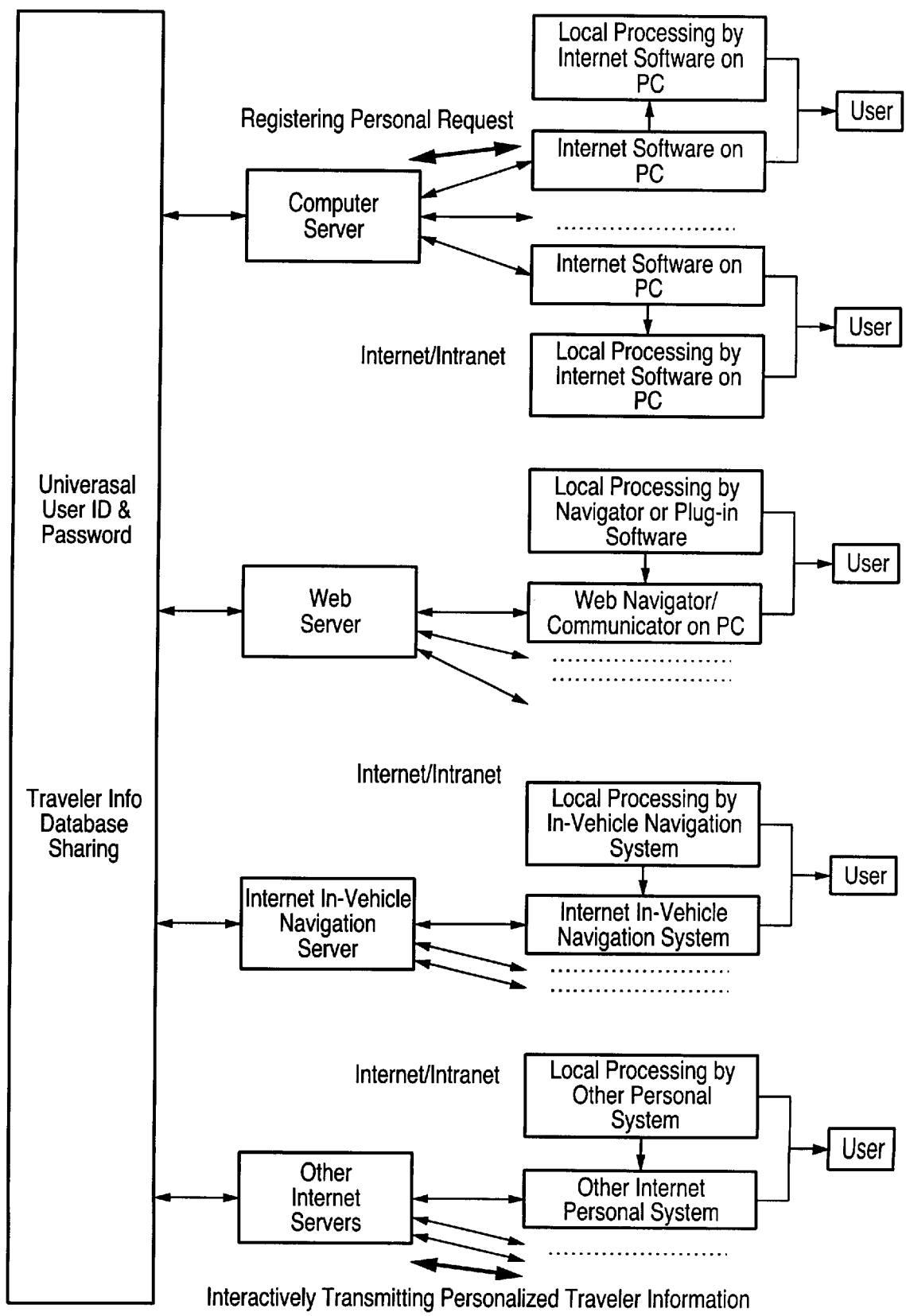
FIG. 2 illustrates the configuration structure and information flow of said combined central and local processing system for providing personalized real-time traveler information via internet/intranet.

FIG. 2 illustrates the configuration structure and information flow of said combined central and local processing system for providing personalized real-time traveler information via internet/intranet. As shown in FIG. 2, a host of a combined central and local processing system could be one or a combination of the following servers:
any type of computer sever, such as a workstation server, mainframe server, or a personal computer server, which supports requests for personalized real-time traveler information via internet software,
a web server, serving a webpage which supports request forms for personalized real-time traveler information via web navigator or communicator,
an internet in-vehicle navigation server, serving in-vehicle navigation service which supports request forms for personalized real-time traveler information via internet-based in-vehicle navigation devices, and
other internet servers, serving internet information and/or service providing which support requests for personalized real-time traveler information.

A host of a combined central and local processing system is able to complete a set of tasks. These tasks could be summarized as follows. Said host receives and stores real-time traveler information from various sources, and processes into a real-time traveler information database, and said host processes said user's real-time request for providing personalized real-time traveler information and transmits completed personalized real-time traveler information to user's internet software as soon as said host receives real-time request from a user via said internet software.

Moreover, said host receives and stores real-time traveler information from various sources, and processes into a real-time traveler information database in html or other webpage format, and said host processes said user's real-time request for providing personalized real-time traveler information and transmits completed personalized real-time traveler information to user's web navigator or web communicator as soon as said host receives real-time request from a user via a web navigator or a web communicator.

In order to serve in-vehicle information needs, said host receives and stores real-time traveler information from various sources, and processes into a real-time traveler information database in email/ascii or other formats, and said host processes said user's real-time request for providing personalized real-time traveler information and transmits completed personalized real-time traveler information to user's internet-based in-vehicle navigation device as soon as said host receives real-time request from a user via an internet-based in-vehicle navigation device. Of course, said host could receive and store real-time traveler information from various sources, and process into a real-time traveler information database in other formats, and said host could process said user's real-time request for providing real-time personalized traveler information and transmit completed personalized real-time traveler information to user's other types of internet tools.

An individual means of a combined central and local processing system could receive, process, and display/provide personalized real-time traveler information over internet/intranet. These individual means and their functions could be summarized as follows:

a personal computer having internet connection devices, internet connection programs (client software, internet software, etc.) and monitor, wherein said internet connection devices and programs are used to connect said personal computer to host server over the internet/intranet, said internet connection programs are used to implement local processing of personalized real-time traveler information, and said monitor will display or broadcast or print the retrieved/processed interactive personalized traveler information, a personal computer having internet connection devices, web navigation programs (navigator, communicator, and plug-in software, etc.) and monitor, wherein said internet connection devices and web navigation programs (navigator, communicator) are used to connect said personal computer to host server over the internet/intranet, said web navigation programs (navigator, communicator, and/or plug-in software) are used to implement local processing of personalized real-time traveler information, and said monitor will display or broadcast or print the retrieved/processed interactive personalized traveler information, an internet in-vehicle navigation device, having wireless internet connection means and computer programs, wherein said wireless internet connection means and computer programs are used to connect said internet in-vehicle navigation device to host server over the internet/intranet, said in-vehicle internet computer programs are used to implement local processing of personalized real-time traveler information, and will display or broadcast the retrieved/processed interactive personalized traveler information, and other internet information receiving devices, having internet connection means, wherein said internet connection means are used to connect said internet information receiving devices to host server over the internet/intranet, local computer programs on these internet information receiving devices are used to implement local processing of personalized real-time traveler information, and will display or broadcast or print the retrieved/processed interactive personalized traveler information.

As shown in FIG. 2, an individual user of a combined central and local processing system could register at said host servers and obtain a universal user ID and password for all individual means for receiving information and warning. Then, said user could use one or several of the following individual means and procedures to receive/process personalized real-time traveler information and warning.

(1) Fill or revise information/warning request forms and request a universal user ID and password for all individual means for receiving information and warning via the following procedures (if said user has completed the forms and does not need to revise the forms or said user does not need to register, skip this step and going to Step (2) directly):

1a) the personalized information and warning providing procedure of a personal computer by using an internet software server as follows: starting an internet software or a client software, going to said software's various request forms for personalized real-time traveler information and warning, selecting a request form on said software, inputting the desired functional items/requests and information/warning update frequency in the request form as default, sending completed forms, completing registration forms if being a first-time user, 1b) the personalized information and warning providing procedure of a personal computer by using a webpage server as follows: starting a web navigator or communicator, going to said host webpage with various request forms for personalized real-time traveler information and warning, selecting a request form on said host webpage, inputting the desired functional items/requests and information/warning update frequency in the request form as default, completing registration forms if being a first-time user, 1c) the personalized information and warning providing procedure of an internet in-vehicle navigation device by using an internet vehicle navigation server as follows: using any of the procedures as stated in procedures 1a)-1b); or filling request forms to host company or host server by regular mail or at host specified sites; or starting internet in-vehicle navigation device, finding request forms for personalized real-time traveler information and warning, selecting a request form, inputting the desired functional items/requests in the request form, completing registration forms if being a first-time user, wherein, a universal user ID and password for all individual means for receiving information will be sent to said user via user-specified means after the initial registration.

(2) Receive and process personalized real-time traveler information via the following procedures (if said user expects to receive abnormal travel condition warning only, skip this step and go to Step (3) directly):

2a) the personalized information providing procedure of a personal computer by using an internet software server as follows:

starting an internet software or client software, going to default forms showing personalized real-time traveler information on said internet software or client software, requesting host processing, receiving and processing/displaying said desired personalized real-time traveler information on said internet software or client software, wherein, if internet software server is very efficient and powerful (high-end workstation, mainframe, or supercomputer), said host identifies user's ID number and password (IP address or other number), finds user-defined default functional items/requests, processes said requested real-time traveler information, and sends back the processed personalized real-time traveler information to said user's internet software or client software based on user-specified or host default update frequency, and said internet software or client software implements a small task of local processing of personalized real-time traveler information (generating a few user desired personalized traveler information functions locally), or if internet software server is a conventional server, said host identifies user's default functional items/requests based on newly received messages (no user ID number and no request forms stored at host server), processes said requested real-time traveler information, and sends back the processed personalized real-time traveler information to said user's internet software or client software based on user-specified or host default update frequency, and said internet software or client software implements a big task of local processing of personalized real-time traveler information (generating many user desired personalized traveler information functions locally), 2b) the personalized information providing procedure of a personal computer by using a webpage server as follows:

starting a web navigator or communicator, going to said host webpage, using bookmark or other means to start the default functional items/requests, requesting webpage host processing, using said web navigator or communicator or plug-in software to implement local processing of personalized real-time traveler information, displaying said desired personalized real-time traveler information on the web navigator or communicator, wherein, if webpage host is very efficient and powerful (high-end workstation, mainframe, or supercomputer), said host identifies user's ID number and password (IP address or other number), finds user-defined default functional items/requests, processes said requested realtime traveler information, sends back the processed personalized real-time traveler information to said user's web navigator or communicator based on user-specified or host default update frequency, and said web navigator or communicator or plug-in software implements a small task of local processing of personalized real-time traveler information (generating a few user desired personalized traveler information functions locally), or if webpage host is a conventional server, said host identifies user's default functional items/requests based on newly received bookmark or other messages (no user ID number and no request forms stored at host server), processes said requested real-time traveler information, sends back the processed personalized real-time traveler information to said user's web navigator or communicator based on user-specified or host default update frequency, and said web navigator or communicator or plug-in software implements a big task of local processing of personalized real-time traveler information (generating many user desired personalized traveler information functions locally), 2c) the personalized information providing procedure of an internet in-vehicle navigation device by using an internet vehicle navigation service server as follows:

starting an internet in-vehicle navigation device, requesting internet in-vehicle navigation host processing, while the internet in-vehicle navigation host server will identify said user's ID number and password, find said user's information request form and items, will process the requested real-time traveler information and send back the processed personalized real-time traveler information to said user's internet in-vehicle navigation device, processing and showing/announcing the desired personalized real-time traveler information on the internet in-vehicle navigation device (said internet in-vehicle navigation device could implement either a small or a big task of local processing of personalized real-time traveler information in order to generate a few or many user desired personalized traveler information functions locally), (3) Receive and process personalized abnormal real-time travel condition warning via the following procedures:

3a) the personalized abnormal real-time travel condition warning procedure of a personal computer by using an internet software server as follows:

starting an internet software or client software, going to default forms showing personalized abnormal real-time travel condition warning on said internet software or client software, requesting host processing, receiving and processing/displaying said desired personalized abnormal real-time travel condition warning on said internet software or client software, no warning message being received or locally generated if no abnormal warning being detected by said server and/or local internet software or client software, wherein, if internet software server is very efficient and powerful (high-end workstation, mainframe, or supercomputer), said host identifies user's ID number and password (IP address or other number), finds user-defined default functional items/requests, processes said requested abnormal real-time travel condition warning, and sends back the processed personalized abnormal real-time travel condition warning to said user's internet software or client software based on user-specified or host default update frequency, and said internet software or client software implements a small task of local processing of personalized abnormal real-time travel condition warning (generating a few user desired personalized abnormal travel condition warning functions locally), or if internet software server is a conventional server, said host identifies user's default functional items/requests based on newly received messages (no user ID number and no request forms stored at host server), processes said requested abnormal real-time travel condition warning, and sends back the processed personalized abnormal real-time travel condition warning to said user's internet software or client software based on user-specified or host default update frequency, and said internet software or client software implements a big task of local processing of personalized abnormal real-time travel condition warning (generating many user desired personalized abnormal travel condition warning functions locally), 3b) the personalized abnormal real-time travel condition warning procedure of a personal computer by using a webpage server as follows:

starting a web navigator or communicator, going to said host webpage, using bookmark or other means to start the default functional items/requests, requesting webpage host processing, using said web navigator or communicator or plug-in software to implement local processing of personalized abnormal real-time travel condition warning, receiving/displaying/announcing said desired personalized abnormal real-time travel condition warning on the web navigator or communicator, no warning message being received or locally generated if no abnormal warning being detected by said server and/or local web navigator or communicator or plug-in software, wherein, if webpage host is very efficient and powerful (high-end workstation, mainframe, or supercomputer), said host identifies user's ID number and password (IP address or other number), finds user-defined default functional items/requests, processes said requested abnormal real-time travel condition warning, sends back the processed personalized abnormal real-time travel condition warning to said user's web navigator or communicator based on user-specified or host default update frequency, and said web navigator or communicator or plug-in software implements a small task of local processing of personalized abnormal real-time travel condition warning (generating a few user desired personalized abnormal travel condition warning functions locally), or if webpage host is a conventional server, said host identifies user's default functional items/requests based on newly received bookmark or other messages (no user ID number and no request forms stored at host server), processes said requested abnormal real-time travel condition warning, sends back the processed personalized abnormal real-time travel condition warning to said user's web navigator or communicator based on user-specified or host default update frequency, and said web navigator or communicator or plug-in software implements a big task of local processing of personalized abnormal real-time travel condition warning (generating many user desired personalized abnormal travel condition warning functions locally), 3c) the personalized abnormal real-time travel condition warning procedure of an internet in-vehicle navigation device by using an internet vehicle navigation service server as follows:

starting an internet in-vehicle navigation device, requesting internet in-vehicle navigation host processing, while the internet in-vehicle navigation host server will identify said user's ID number and password, find said user's information request form and items, will process the requested abnormal real-time travel condition warning and send back the processed personalized abnormal real-time travel condition warning to said user's internet in-vehicle navigation device, processing and showing/announcing the desired personalized abnormal real-time travel condition warning on the internet in-vehicle navigation device, no warning message being received or locally generated if no abnormal warning being detected by said server or in-vehicle internet software, (said internet in-vehicle navigation device could implement either a small or a big task of local processing of personalized abnormal travel condition warning in order to generate a few or many user desired personalized abnormal travel condition warning functions locally).

Compared to the procedures used in a central processing system, the major difference is that in a combined system, the personalized information provided to said user has to be processed by a local individual means (see FIG. 2). While in a central processing system, no such local information processing is necessary and local individual means only display or announce the personalized information received from said host.

As applications of said central processing system and combined central and local processing system, the webpage-based central processing system and the webpage-based combined central and local processing system are disclosed. FIG. 3 shows an example design of the webpages of said webpage-based central processing system or said webpage-based combined central and local processing system in accordance with an embodiment of the present invention. Although the design of webpages could change from time to time and from designer to designer, the system design method and information flow of these webpage-based systems are the same as those in said central processing system or said combined central and local processing system.

In a webpage-based central processing system, said webpage site serves as an interactive graphical user interface for said user to access traveler information and input their personal preference and selections in terms of traveler information and receiving means. Said webpage server offers the following procedures and hierarchical webpages for webpage users:

(1) Start said web navigator (or communicator).
(2) Select top webpages with information on (for bookmark or customized navigator users, skip this step and go to customized webpages directly):
   2a) country, state, city, time (real-time or historical),
   2b) highway (including freeway, arterial, city streets, etc.), transit (bus, train, subway, etc.), parking, others (airport, tourist, rent-a-car, taxi, etc.), or all transportation modes and means.
(3) After a city is selected, select request forms for personalized real-time traveler information providing, including (for bookmark or customized navigator users, skip this step and go to customized webpages directly):
   3a) current traffic information form,
   3b) predicted traffic information form,
   3c) current/predicted transit information form,
   3d) abnormal travel condition warning form,
   3e) current/predicted parking information form,
   3f) travel choice advisory form,
   3g) other travel information form,
   3h) travel information map display form,
   3i) information providing means form.
(4) After one or more request forms are selected, fill each request form (for bookmark or customized navigator users, skip this step and go to customized webpages directly):
   4a) for either current or predicted traffic information forms, selecting the following items and update frequency based on said user's preference: route-specific and point-to-point travel time, speed, incident, construction activities, driving condition, parking, weather, transit, special events, toll, bicycle, and public information,
   4b) for current/predicted transit information form, selecting the following items and update frequency based on said user's preference: route-specific and point-to-point information of line name, schedule, stop name, arrival time, stop-to-stop time/fare/delays, route maps, real-time status and transfer on bus/subway/rail, dial-a-ride, and park-and-ride,
   4c) for abnormal travel condition warning form, selecting the following items and update frequency based on said user's preference: display, voice, or email warning on route-specific and point-to-point travel time, speed, incident, construction activities, driving condition, parking, weather, transit, special events, toll, bicycle, and public information,
   4d) for current/predicted parking information form, selecting the following items and update frequency based on said user's preference: route-specific and destination-specific parking information on location, cost, availability, and direction,
   4e) for travel choice advisory form, selecting the following items and update frequency based on said user's preference: route-specific and point-to-point navigation, travel choice advisory or recommendation on highway travel (alternative route, departure time, parking), mode (car, carpooling, transit, bicycle), transit travel (bus, train, subway, transfer),
   4f) for other travel information form, selecting the following items and update frequency based on said user's preference: user-defined information on airport (flight information and airport services), tourist (recreational facilities and activities), rent-a-car (company, price, location, availability), taxi (reservation and fare), 4g) for travel information map display function, selecting the following items and update frequency based on said user's preference: user-defined, route-specific and point-to-point map display on current traffic condition, predicted traffic condition, transit information, parking condition, 4h) for information providing means, selecting the following items and update frequency based on said user's preference: webpage, email, pager, fax, internet fax, phone, internet phone, cellular phone, kiosks, interactive TV, internet TV, cable TV, hand-held devices, in-vehicle navigation devices.

(5) Display and announce personalized real-time traveler information and warning (route-specific and point-to-point) via user-preferred means.

In a webpage-based central processing system, said host receives various real-time traveler information from transportation agencies and other sources, processes real-time traveler information and warning into webpage format, and place said processed information and warning in hierarchical and classified webpage structure in said web site. Said user uses an individual means such as a web navigator or communicator installed on a personal computer or internet computer or web TV to browse said webpage host, and to select and to receive/display/announce said personalized real-time traveler information and warning via the following information providing procedure:

a) starting a web navigator or communicator, b) finding said host webpage with various request forms for personalized real-time traveler information (going to bookmarked webpages directly if bookmarked traveler information webpage being selected), c) selecting a traveler information request form on said host webpage (skipping this step if bookmarked traveler information webpage being selected), d) inputting the desired functional items/requests in the request form and requesting webpage host processing (skipping this sub-step if bookmarked traveler information webpage being selected), while the webpage host will process the requested real-time traveler information and send back the processed personalized real-time traveler information and warning to said user's web navigator or communicator, e) said web navigator (or communicator) showing or announcing the desired personalized real-time traveler information and warning on the web navigator or communicator.

As shown in the example design in FIG. 3, the top-level webpage shows the major traveler information functions. If any of these functions is chosen by said user, it goes down to the second-level webpages which have the detailed items and choices for each of the above functions. For example, if "Current Traffic Info" is selected at the top-level webpage, the second-level webpage will show the following choice items:

Freeway/City Streets,

Incident,

Road Construction,

Road Driving Condition,

Toll Info.

If functional items "Freeway/City Streets" and "Incident" are selected, said user will be able to select and display the route-specific and point-to-point current traffic information. For example, when route #1 is defined as "I-90", From point is defined as "1st St.", and To point is defined as "State St.", the information table shows that there is one incident, average speed is 25 mph, and total travel time is 28 minutes between "1st St." and "State St." on route #1 (I-90). Of course, said user could choose more routes and select more functional items. In addition, said user could set up the information updating time (e.g., 7:00 am, 5:00 pm, everyday). Finally, said user could select the current information requests as default and select several individual means (e.g., webpage, email, and pager) to receive these information items at each updating time (e.g., 7:00 am, 5:00 pm, everyday).

In a webpage-based combined central and local processing system, said webpage site and said plug-in software serve as interactive graphical user interfaces for said user to access traveler information and input their personal preference and selections in terms of traveler information and receiving means. Said webpage server and said plug-in software offer the following procedure and hierarchical webpages and external display windows for said webpage and said plug-in software users:

(1) Start said web navigator (or communicator) and said plug-in software.

(2) Select top webpages with information on (for bookmark or customized navigator users, skip this step and go to customized webpages directly):

2a) country, state, city, time (real-time or historical), 2b) highway (including freeway, arterial, city streets, etc.), transit (bus, train, subway, etc.), parking, others (airport, tourist, rent-a-car, taxi, etc.), or all transportation modes and means.

(3) After a city is selected, select request forms for personalized real-time traveler information providing on said web navigator (or communicator), including:

a) current traffic information form, b) predicted traffic information form, c) current/predicted transit information form, d) current/predicted parking information form, e) travel choice advisory form, f) abnormal travel condition warning form, g) other travel information form, h) travel information map display form, (for bookmark or customized navigator users, skip this step and go to customized webpages directly)

or select the above functional forms and additional enhanced user interfaces and utilities on said plug-in software, such as:

a) travel information map display function and routing display function on real-time Geographic Information System.

(4) After one or more request forms are selected, fill each request form on said web navigator or communicator (for bookmark or customized navigator users, skip this step and go to customized webpages directly):

4a) for either current or predicted traffic information form, selecting the following items and update frequency based on said user's preference: route-specific and point-to-point travel time, speed, incident, construction activities, driving condition, parking, weather, transit, special events, toll, bicycle, and public information, 4b) for current or predicted transit information form, selecting the following items and update frequency based on said user's preference: route-specific and point-to-point information of line name, schedule, stop name, arrival time, stop-to-stop time/fare/delays, route maps, real-time status and transfer on bus/subway/rail, dial-a-ride, and park-and-ride, 4c) for abnormal travel condition warning form, selecting the following items and update frequency based on said user's preference: display, voice, or email warning on route-specific and point-to-point travel time, speed, incident, construction activities, driving condition, parking, weather, transit, special events, toll, bicycle, and public information, 4d) for current or predicted parking information form, selecting the following items and update frequency based on said user's preference: route-specific and destination-specific parking information on location, cost, availability, and direction, 4e) for travel choice advisory form, selecting the following items and update frequency based on said user's preference: route-specific and point-to-point navigation, travel choice advisory or recommendation on highway travel (alternative route, departure time, parking), mode (car, carpooling, transit, bicycle), transit travel (bus, train, subway, transfer), 4f) for other travel information form, selecting the following items and update frequency based on said user's preference: user-defined information on airport (flight information and airport services), tourist (recreational facilities and activities), rent-a-car (company, price, location, availability), taxi (reservation and fare), 4g) for travel information map display function, selecting the following items and update frequency based on said user's preference: user-defined, route-specific and point-to-point map display on current traffic condition, predicted traffic condition, transit information, parking condition, 4h) for information providing means, selecting the following items and update frequency based on said user's preference: webpage, email, pager, fax, internet fax, phone, internet phone, cellular phone, kiosks, interactive TV, internet TV, cable TV, hand-held devices, in-vehicle navigation devices.

(5) Said plug-in software collect all user-defined information from said webpage or other webpages which provide traveler information, process the information into user-specified format, update, display and announce user-defined information with additional user interface and utilities provided by said plug-in software, (6) Display and announce personalized real-time traveler information and warning (route-specific and point-to-point) via user-preferred means.

As discussed in the above, the allocation of personalized traveler information providing functions between said webpage server and said plug-in software could change from system to system. If said webpage server offers more personalized traveler information, it is fine that said plug-in software provides less personalized traveler information. On the other hand, if said webpage server offers less personalized traveler information, it is desirable that said plug-in software provide more personalized traveler information.

In a webpage-based combined central and local processing system, said host also receives various real-time traveler information from transportation agencies and other sources, processes real-time traveler information and warning into webpage format, and place the processed information and warning in hierarchical and classified webpage structure in said web site. An user uses an individual means such as a web navigator or communicator and a plug-in software installed on a personal computer or internet computer or web TV to browse said webpage host, and select, receive, and process said personalized real-time traveler information and warning via the following information providing procedure:

a) starting a web navigator or communicator, b) starting said plug-in software to attach to or overlay on said web navigator or communicator, c) finding said host webpage with various request forms for personalized real-time traveler information (going to bookmarked webpages directly if bookmarked traveler information webpage being selected), d) selecting a traveler information request form on said host webpage (skipping this step if bookmarked traveler information webpage being selected), e) inputting the desired functional items/requests in the request form and requesting webpage host processing (skipping this sub-step if bookmarked traveler information webpage being selected), while the webpage host will process the requested real-time traveler information and send back the processed personalized real-time traveler information and warning to said user's web navigator or communicator, f) said web navigator (or communicator) showing or announcing the desired personalized real-time traveler information and warning on the web navigator or communicator, g) said plug-in software processing and showing or announcing additional personalized real-time traveler information and warning by using its enhanced utilities and interface, h) displaying route-specific and point-to-point travel information/warning and routing maps on said navigator or communicator or plug-in software once real-time database is received and processed by said plug-in software or said navigator or communicator.

It is claimed that:

1. A method of providing personalized traveler data to a user comprising the steps of;

maintaining a real-time database containing travel information, on a Web server;

automatically updating said information in said database in real time over the Internet;

entering requests for personal traveler information into a local processing system, said requests comprising requests to be performed on the Web server reached over the Internet and requests to be performed on the local processing system;

contacting the Web server over the Internet with an Internet connection hardware device and establishing a communication link utilizing an Internet communication program;

transmitting to said Web server the requests to be performed on the Web server of said requests for personal traveler information;

causing the Web server to contact the local processing system at a user specified update frequency and to transmit to the local processing system information processed to the requests to be performed on the Web server from said real-time database; and processing said information received from the Web server on the local processing system and processing on the local processing system said requests to be performed on the local processing system, and presenting the processed information from the local processing system and the Web server to the user.

2. The method of claim 1 wherein the information processed to the requests for personalized real-time traveler data is parking related.

3. The method of claim 1 wherein the information processed to the requests for personalized real-time traveler data is airport flight departure times.

4. The method of claim 1 wherein the information processed to the requests for personalized real-time traveler data is airport flight arrival times.

5. The method of claim 1 wherein the information processed to the requests for personalized real-time traveler data is information about a secondary transit system selected from the group including bus, subway, train, ferry and taxi.

6. The method of claim 1 wherein the information processed to the requests for personalized real-time traveler data is driving conditions along a selected route.

7. The method of claim 6 wherein the driving conditions processed to the requests for personalized real-time traveler data include weather conditions.

8. The method of claim 6 wherein the driving conditions processed to the requests for personalized real-time traveler data include traffic conditions.

9. The method of claim 6 wherein the driving conditions processed to the requests for personalized real-time traveler data include lane closures along a selected route.

10. The method of claim 1 wherein the step of causing the web server to contact the local processing system at a user specified update frequency and to transmit to the local processing system information processed to the requests to be performed on the Web server reached over the Internet is performed by transmitting periodic email messages.

11. The method of claim 1 wherein the step of maintaining a real-time database containing travel information processed to the request for personalized real-time traveler data is accomplished by maintaining a directory and file hierarchy in the following sequence: state, city, time.

12. The method of claim 1 wherein the step of causing the web server to contact the local processing system at a user-defined frequency and to transmit to the local processing system information processed to the first part requests for personalized real-time traveler data from said real-time database further comprises communicating with the traveler by a device selected from the group comprising pager, phone, and cellular phone.

* * * * *